(12) United States Patent
Tallam et al.

(10) Patent No.: US 8,107,267 B2
(45) Date of Patent: *Jan. 31, 2012

(54) SYSTEMS AND METHODS FOR COMMON-MODE VOLTAGE REDUCTION IN FULLY REGENERATIVE AC DRIVES

(75) Inventors: Rangarajan Tallam, Germantown, WI (US); Russel Kerkman, Milwaukee, WI (US); David Leggate, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/429,309

(22) Filed: Apr. 24, 2009

(65) Prior Publication Data

US 2010/0172162 A1 Jul. 8, 2010

Related U.S. Application Data

(60) Provisional application No. 61/143,028, filed on Jan. 7, 2009.

(51) Int. Cl.
*H02M 5/45* (2006.01)
(52) U.S. Cl. ............... 363/37; 363/127; 363/132
(58) Field of Classification Search ............ 363/34, 363/35, 37, 87, 98, 127, 132
See application file for complete search history.

(56) References Cited

U.S. PATENT DOCUMENTS

| | | | |
|---|---|---|---|
| 6,359,416 B1 | 3/2002 | Rao et al. | |
| 6,469,916 B1 | 10/2002 | Kerkman et al. | |
| 6,477,067 B1 | 11/2002 | Kerkman et al. | |
| 6,541,933 B1 | 4/2003 | Leggate et al. | |
| 6,617,821 B2 | 9/2003 | Kerkman et al. | |
| 6,636,012 B2 | 10/2003 | Royak et al. | |
| 6,703,809 B2 | 3/2004 | Royak et al. | |
| 6,720,748 B1 | 4/2004 | Seibel et al. | |
| 6,819,070 B2 | 11/2004 | Kerkman et al. | |
| 6,819,077 B1 | 11/2004 | Seibel et al. | |
| 6,842,354 B1 | 1/2005 | Tallam et al. | |
| 6,982,533 B2 | 1/2006 | Seibel et al. | |
| 7,034,501 B1 | 4/2006 | Thunes et al. | |
| 7,106,025 B1 | 9/2006 | Yin et al. | |
| 7,164,254 B2 | 1/2007 | Kerkman et al. | |
| 7,215,559 B2 | 5/2007 | Nondahl et al. | |
| 7,336,509 B2 | 2/2008 | Tallam | |
| 7,342,380 B1 | 3/2008 | Kerkman et al. | |
| 7,356,441 B2 | 4/2008 | Kerkman et al. | |
| 7,385,372 B2 * | 6/2008 | Ahmad et al. ............ 318/811 |
| 7,400,518 B2 | 7/2008 | Yin et al. | |
| 7,738,267 B1 * | 7/2008 | Yin et al. ............ 363/41 |

(Continued)

OTHER PUBLICATIONS

Taiwan Patent Publication TW439350, Jun. 7, 2001.

(Continued)

*Primary Examiner* — Jessica Han
(74) *Attorney, Agent, or Firm* — Fay Sharpe LLP; Alexander R. Kuszewski; John M. Miller

(57) ABSTRACT

Control systems, methods and fully regenerative power conversion systems are presented for mitigating common mode voltages in AC loads by employing inverter and/or active rectifier PWM control using switching sequences with only active vectors where a first vector of each switching sequence differs by one phase switching state from a last vector of a switching sequence of an adjacent sector.

21 Claims, 14 Drawing Sheets

U.S. PATENT DOCUMENTS 7,944,161 B2 * 6/2010 Tallam et al. ............... 363/35

OTHER PUBLICATIONS

Emre Un and Ahmet M. Hava, "A Near State PWM Method With Reduced Switching Frequency and Reduced Common Mode Voltage for Three-Phase Voltage Source Inverters", 2007 IEEE.

A.M. De Broe, A.L. Julian, and T.A. Lipo, "Neutral-To-Ground Voltage Minimization in a PWm-Rectifier/Inverter Configuration", Power Electronics and Variable Speed Drives, Sep. 23-25, 1996, Conference Publication No. 429, IEEE, 1996.

Jay M. Erdman, Russel J. Kerkman, David W. Schlegel, and Gary L. Skibinski, "Effect of PWM Inverters on AC Motor Bearing Currents and Shaft Voltages", 1996 IEEE.

A. Muetze & A. Binder, "Don't Lose Your Bearings", Mitigation techniques for bearing currents in inverter-supplied drive systems, 2006 IEEE.

Yeb-Shin Lai and Fu-San Shyu, "Optimal Common-Mode Voltage Reduction PWM Technique for Inverter Control with Consideration of the Dead-Time Effects—Part I: Basic Development", 2004 IEEE.

Qiang Yin, Russel J. Kerkman, Thomas A. Nondahl, and Haihui Lu, "Analytical Investigation of the Switching Frequency Harmonic characteristic for Common Mode Reduction Modulator", 2005 IEEE.

Russel J. Kerkman, David Leggate, Dave Schlegel, and Gary Skibinskil, "PWM Inverters and Their Influence on Motor Over-Voltage", 1997 IEEE.

Emre Un and Ahmet M. Hava, "A High Performance PWM Algorithm for Common Mode Voltage Reduction in Three-Phase Voltage Source Inverters", 2008 IEEE.

* cited by examiner

CMR SWITCHING SEQUENCES

162a — SECTOR 1: | 101 | 100 | 110 | 010 | 110 | 100 | 101 |
CCW / CW

162b — SECTOR 2: | 100 | 110 | 010 | 011 | 010 | 110 | 100 |
CCW / CW

162c — SECTOR 3: | 110 | 010 | 011 | 001 | 011 | 010 | 110 |
CCW / CW

162d — SECTOR 4: | 010 | 011 | 001 | 101 | 001 | 011 | 010 |
CCW / CW

162e — SECTOR 5: | 011 | 001 | 101 | 100 | 101 | 001 | 011 |
CCW / CW

162f — SECTOR 6: | 001 | 101 | 100 | 110 | 100 | 101 | 001 |
CCW / CW

280 →

|  | | INVERTER (SVPWM) | | | |
|---|---|---|---|---|---|
| | Vector | 1,3,5 | 2,4,6 | 7 | 8 |
| RECTIFIER (CMRPWM) | 1,3,5 | 0 | 0.33 | 0.67 | -0.33 |
| | 2,4,6 | -0.33 | 0 | 0.33 | -0.67 |

|  | | INVERTER (CMRPWM) | |
|---|---|---|---|
| | Vector | 1,3,5 | 2,4,6 |
| RECTIFIER (SVPWM) | 1,3,5 | 0 | 0.33 |
| | 2,4,6 | -0.33 | 0 |
| | 7 | -0.67 | -0.33 |
| | 8 | 0.33 | 0.67 |

|  | | INVERTER (CMRPWM) | |
|---|---|---|---|
| | Vector | 1,3,5 | 2,4,6 |
| RECTIFIER (CMRWM) | 1,3,5 | 0 | 0.33 |
| | 2,4,6 | -0.33 | 0 |

FIG. 3G

SYSTEMS AND METHODS FOR COMMON-MODE VOLTAGE REDUCTION IN FULLY REGENERATIVE AC DRIVES

REFERENCE TO RELATED APPLICATION

This application claims priority to and the benefit of U.S. Provisional Patent Application Ser. No. 61/143,028, which was filed Jan. 7, 2009, entitled COMMON-MODE VOLTAGE REDUCTION PWM ALGORITHM FOR AC DRIVES, the entirety of which is hereby incorporated by reference.

FIELD OF THE INVENTION

The present disclosure relates generally to electrical power conversion and more particularly to mitigating common mode voltages in fully regenerative AC motor drives.

BACKGROUND OF THE INVENTION

Power conversion systems convert electrical power from one form to another and may be employed in a variety of applications such as motor drives for powering an electric motor using power from an input source. Such power converters are typically constructed using electrical switches actuated in a controlled fashion to selectively convert input power to output power of a desired form such as single or multi-phase AC of a controlled amplitude, frequency and phase to drive an AC motor according to a desired speed and/or torque profile, often in the presence of varying load conditions. AC motor drives generally provide a controlled AC output via an inverter that converts DC to AC using an array of high-voltage, high-speed semiconductor-based switching devices. The inverter switches are actuated through various forms of pulse width modulation (PWM), with the timing of the array switching determining the power conversion performance to convert power from a DC bus to variable frequency, variable amplitude single or multi-phase AC output power. The PWM switching states used in the inverter are often modeled in terms of a space vector diagram that includes zero vectors at a diagram origin and non-zero (active) vectors, where such control is sometimes referred to as space vector modulation (SVM) or space vector pulse width modulation (SVPWM). U.S. Pat. No. 7,164,254 to Kerkman et al., issued Jan. 16, 2007 and assigned to the assignee of the present application discloses common mode voltage reduction techniques in which the switching sequence is modified to avoid using the zero vectors so as to reduce common mode voltages in the motor. The entirety of this patent is hereby incorporated by reference as if fully set forth herein. U.S. Pat. No. 7,106,025 to Yin et al., issued Sep. 12, 2006 and assigned to the assignee of the present application discloses techniques for canceling dead time effects in the algorithm to reduce common mode voltages produced by a three-phase power conversion device in a rectifier/inverter variable frequency drive (VFD), the entirety of which is hereby incorporated by reference as if fully set forth herein. U.S. Pat. No. 6,819,070 to Kerkman et al., issued Nov. 16, 2004 and assigned to the assignee of the present application discloses inverter switching control techniques to control reflected voltages in AC motor drives, the entirety of which is hereby incorporated by reference as if fully set forth herein. U.S. Pat. No. 7,034,501 to Thunes et al., issued Apr. 25, 2007 and assigned to the assignee of the present application discloses gate pulse time interval adjustment techniques for mitigating reflected waves in AC motor drives, the entirety of which is hereby incorporated by reference as if fully set forth herein.

SUMMARY OF INVENTION

Various aspects of the present disclosure are now summarized to provide a basic understanding of the disclosure, where the following is not an extensive overview of the disclosure, and is intended neither to identify certain elements of the disclosure, nor to delineate the scope thereof. This summary presents certain concepts of the disclosure in a simplified form prior to the more detailed description that is presented hereinafter. The present disclosure is directed to pulse width modulation techniques for controlling an active power converter having an active rectifier and an inverter, and finds particular utility in association with fully regenerative motor drive converters having an active switching rectifier and a switching inverter used to drive AC motor loads. The novel aspects described herein may be advantageously employed to reduce common mode voltage effects by employment of active vector-only switching sequences in pulse width modulation of one or both of the active rectifier and switching inverter, alone or in combination with reflected wave mitigation techniques, and/or deadtime compensation in the inverter.

In accordance with one or more aspects of the present disclosure, a power conversion system is provided, which includes an active rectifier and an inverter connected by an intermediate DC circuit with first and second DC current paths. The active rectifier includes an AC input and a switching network with a plurality of rectifier switching devices individually coupled between the AC input and one of the DC current paths of the DC circuit. The rectifier switching devices are individually operable to selectively electrically couple the AC input with a corresponding DC current path according to a corresponding rectifier switching control signal to generate rectified DC power in the intermediate circuit. The inverter includes a multi-phase AC connection and an inverter switching network with a plurality of inverter switching devices individually coupled between one of the DC current paths and one of the AC terminals and operable according to a corresponding inverter switching control signal. The power conversion system further includes a switch control system with rectifier and inverter control components to provide the corresponding rectifier and inverter switching control signals. The switch control system, moreover, provides either or both of the rectifier switching control signals and the inverter switching control signals by pulse width modulation according to a selected switching sequence corresponding to a sector of a space vector modulation diagram in which a reference vector is currently located, with each switching sequence using only active vectors with a first vector of each switching sequence differing by one phase switching state from a last vector of a switching sequence of an adjacent sector. The employment of only active vectors in the PWM switching sequence advantageously mitigates common mode voltage issues in the regenerative converter.

In further aspects, the switch control system provides both of the rectifier switching control signals and the inverter switching control signals by pulse width modulation according to selected switching sequences using only active vectors. The switch control system is operative in certain implementations to synchronize the rectifier switching control signals and the inverter switching control signals. In other implementations, the rectifier switching control signals and the inverter switching control signals are not synchronized. In accordance with other aspects, the inverter control component includes a deadtime compensation component to adjust one or more feedback signals or values higher or lower for deadtime compensation at switching state transitions and/or at sector transitions. The inverter control component in other aspects includes a reflected wave reduction component operative to provide minimum differences between the feedback signals or values Φ to further mitigate common mode voltages.

In accordance with other aspects of the disclosure, a method is provided for mitigating common mode voltages in a regenerative power conversion system. The method includes providing pulse width modulated rectifier switching control signals to a plurality of rectifier switching devices of the active rectifier to rectify input AC electrical power to selectively provide DC power to the DC circuit, and providing pulse width modulated inverter switching control signals to a plurality of inverter switching devices of the inverter to convert DC power to cause the inverter to selectively provide multi-phase AC electrical output power, where either or both of the rectifier switching control signals and the inverter switching control signals are provided according to switching sequences using only active vectors, and the method may further include synchronizing the rectifier switching control signals and the inverter switching control signals.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIGS. 3E-3G illustrate tables showing inverter and active rectifier switching vector usage and corresponding worst case common mode voltages for selective use of common mode reduction pulse width modulation (CMRPWM) switching sequences in the active rectifier only, the inverter only, and both, respectively, in the power conversion system of FIG. 1A;

DETAILED DESCRIPTION OF THE INVENTION

Figure 1A:
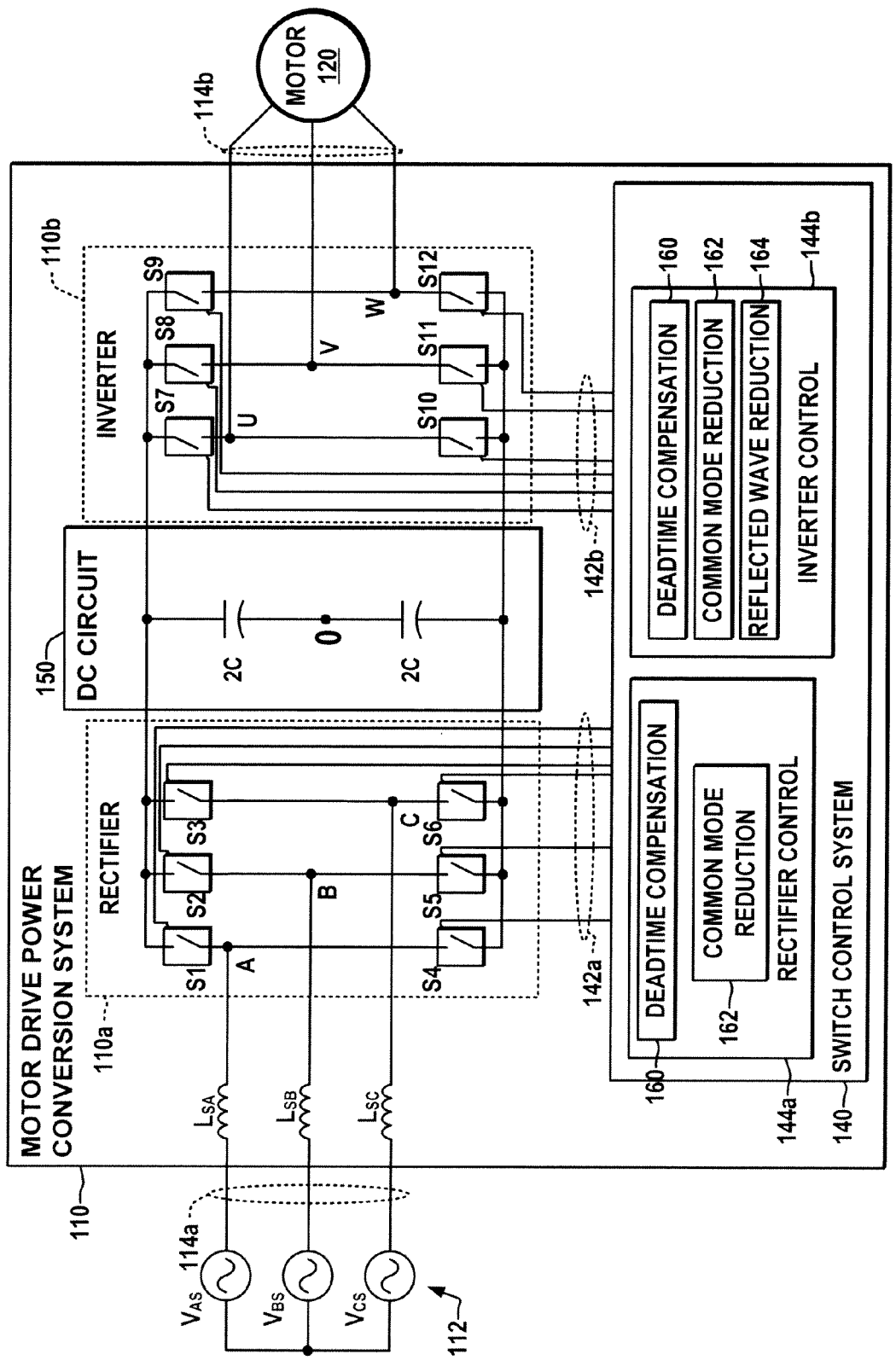
FIG. 1A is a schematic diagram illustrating an exemplary fully regenerative motor drive power conversion system with an active rectifier and a switching inverter controlled according to various aspects of the disclosure to drive a three-phase AC motor by converting power from a DC circuit.

Referring now to the figures, several embodiments or implementations of the present disclosure are hereinafter described in conjunction with the drawings, wherein like reference numerals are used to refer to like elements throughout, and wherein the various features are not necessarily drawn to scale. The disclosure provides pulse width modulation methods and control systems for operating fully regenerative power conversion systems, in which common mode voltage problems are mitigated by use of switching sequences in either or both of the active rectifier and/or the inverter that avoid zero vectors. The various aspects of the disclosure are hereinafter illustrated and described in the context of motor drives with internal active rectifiers and switching inverters for driving multiphase AC motors, although the various aspects of the disclosure may be employed in power conversion systems generally, including those providing single or multiphase AC outputs, those deriving DC input power from any suitable source, and those that drive motors or other AC loads, wherein all such alternate implementations and applications are deemed to fall within the scope of the present disclosure and the appended claims.

FIG. 1A illustrates a regenerative power conversion system 110 including various concepts of the present disclosure constituting an exemplary switching type AC-DC-AC motor drive configured to drive a multiphase AC motor 120, such as an induction motor, although the disclosure is not limited to the illustrated embodiments. The exemplary power converter 110 is a voltage source converter type system, although variant embodiments are contemplated as falling within the scope of the present disclosure and the claims. The exemplary power system in FIG. 1A has a multiphase AC power source 112 providing AC electric power to the conversion system or drive 110. The system 110 includes an active line side rectifier 110*a* and a machine (load) side switching inverter 110*b*, where the rectifier 110*a* is a switching rectifier with switching devices S1-S6. The inverter 110*b* and the switching rectifier 110*a* are operated by a switch control system 140 for motor drive operation where the rectifier 110*a* and inverter 110*b* are coupled by a DC circuit 150 to selectively provide three-phase electric power to the motor load 120. In the illustrated example, the three-phase AC power source 112 provides electrical power to the motor drive 110 via a three-phase input 114*a* for conversion to supply a DC bus in the DC circuit 150, with the inverter generating AC output signals using power from the DC circuit 150. The present disclosure may be advantageously employed in association with single-phase and/or multiphase input or output implementations, and the source 112 and load 120 may be operated at any suitable frequency and amplitudes with the motor drive 110 being adapted to receive and convert the input AC power at the supply frequency.

In the active rectifier 110*a*, the AC input power is switched by a first set of switches S1-S6 constituting a line side converter 110*a* in the form of a switching regulator circuit or stage to create an intermediate DC bus voltage according to switching control signals 142*a*, where the exemplary DC circuit 150 provides a stable DC bus with capacitance C for subsequent inversion to drive the motor 120. On the machine side, the exemplary inverter 110*b* includes an array of switching devices S7-S12 that are operated according to corresponding switching control signals 142*b* to selectively switch the DC power to provide AC power to an AC output 114*b* for driving the motor 120, with the intermediate DC circuit 150 providing forward and reverse current paths between the rectifier 110*a* and the inverter 110*b*. A forward or positive DC path in the circuit 150 is connected to the upper rectifier switches S1-S3 and to the upper output switches S7-S9 of the inverter 110*b*, and a negative or return DC path is coupled to the lower rectifier switches S4-S6 and to the lower output switches S10-S12 of the inverter 110*b*. The exemplary motor drive 110, moreover, includes line reactors LSA, LSB, and LSC connected in series between the input phase sources VAS, VBS, and VCS (112) and corresponding switch circuit input nodes A, B, and C (114*a*), respectively, of the rectifier 110*a*, and the inverter 110*b* is shown generating three-phase AC output voltages and currents at the output phases U, V, and W (114*b*), wherein other implementations may include various optional input and/or output filter capacitors (not shown).

Figure 1B:
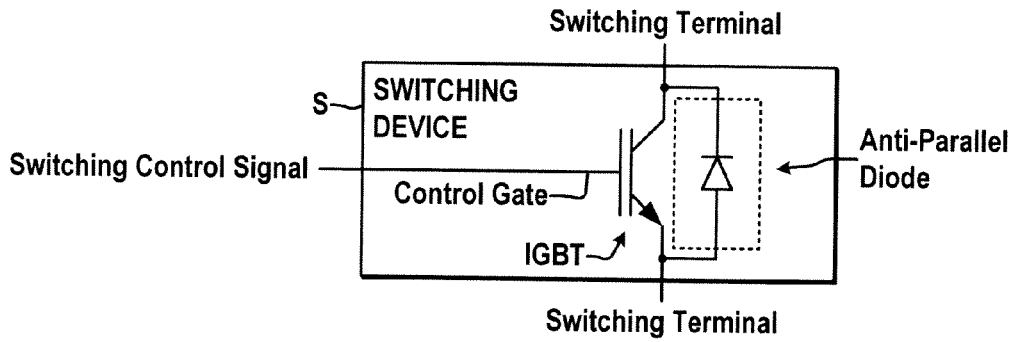
FIG. 1B is a schematic diagram illustrating an exemplary IGBT type switching device with anti-parallel diode used to selectively convert DC power into AC output power in the inverter of FIG. 1A in accordance with the present disclosure.

Referring also to FIG. 1B, the switching devices S1-S6 and S7-S12 (FIG. 1A) may be any suitable controllable electrical switch types (e.g., thyristors, IGBTs, etc.) that are controlled according to any suitable type or form of switching signals 142*a*, 142*b* from the switch control system 140. In the illustrated embodiments, IGBT switching devices S are used, as exemplified in FIG. 1B. This implementation includes anti-parallel diodes connected in parallel across the switching terminals, with a base or control gate terminal being coupled with the switch control system 140 to receive a corresponding switching control signal 142 for selectively electrically connecting or decoupling the two switching terminals.

Figure 1C:
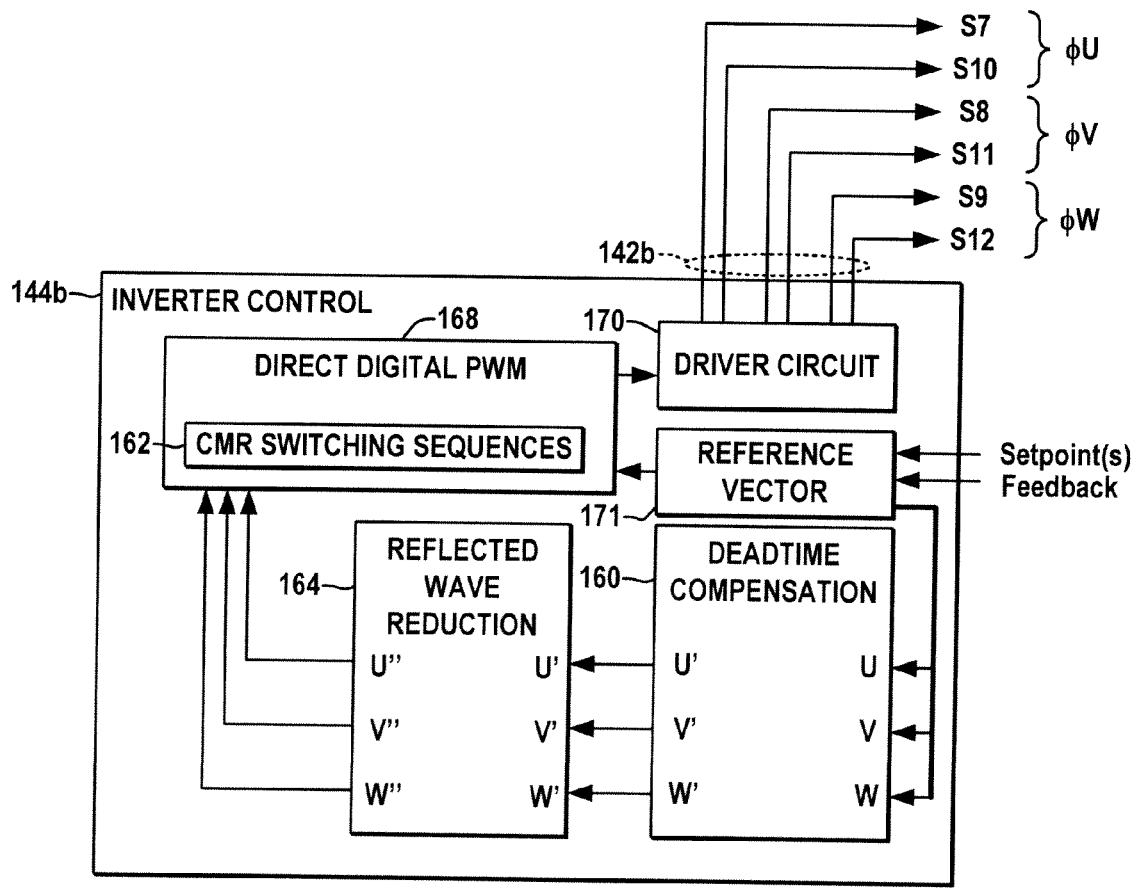
FIG. 1C is a schematic diagram illustrating one exemplary inverter switch control system implementing direct digital pulse width modulation using common mode reduction space vector modulation switching sequences, reflected wave reduction and deadtime compensation components in accordance with various aspects of the present disclosure.
Figure 1D:
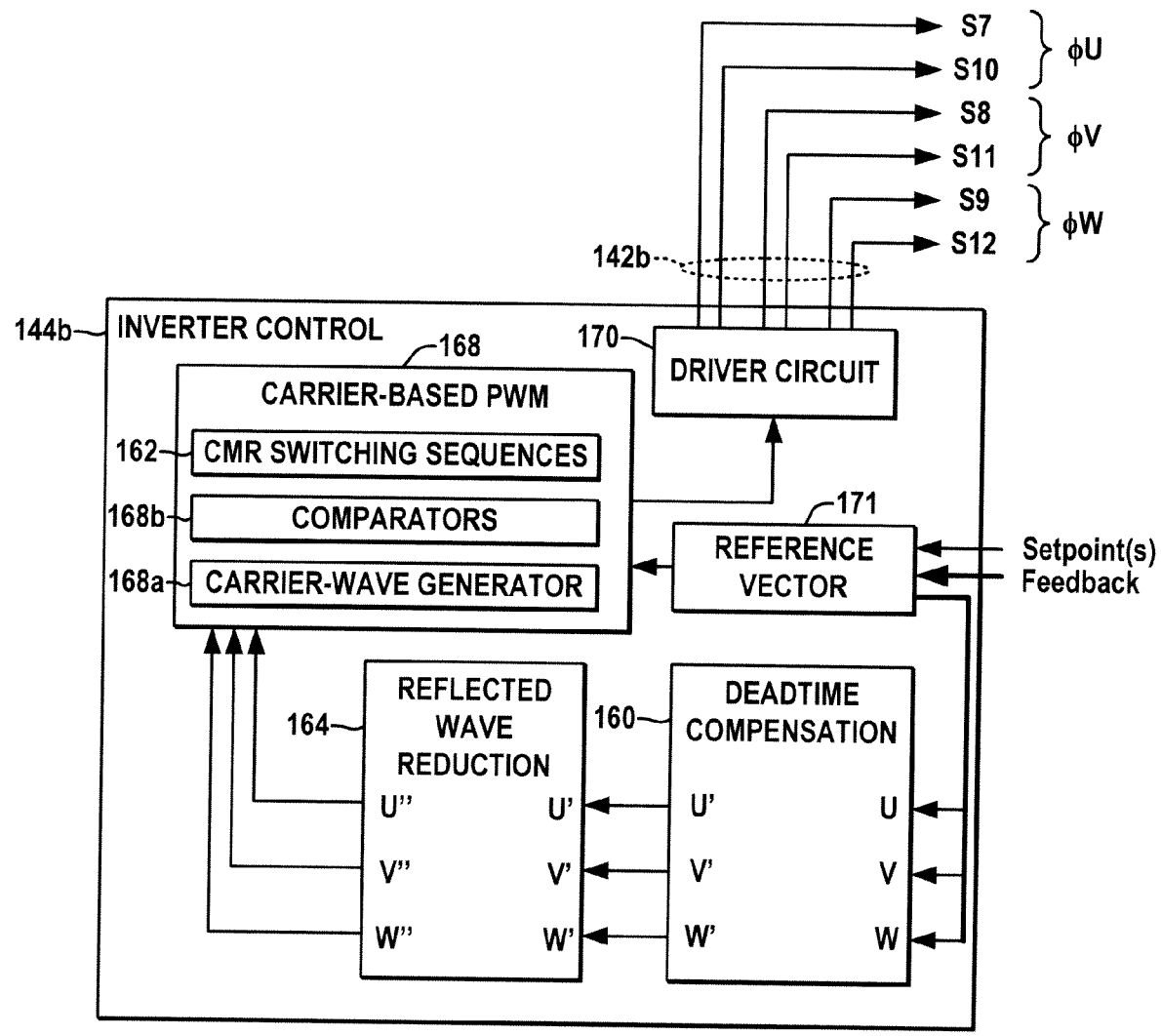
FIG. 1D is a schematic diagram illustrating another exemplary inverter switch control system implementing carrier-based, sine-triangle pulse width modulation with a carrier-wave generator and comparators using common mode reduction space vector modulation switching sequences, reflected wave reduction and deadtime compensation components in accordance with the present disclosure.

Referring also to FIGS. 1C and 1D, the switching control signals 142*b* are provided to the inverter 110*b* from an inverter portion 144*b* of the switch control system 140, which may employ any suitable form of pulse width modulation circuitry to implement direct digital PWM (FIG. 1C) or carrier-based PWM (FIG. 1D). With respect to the switching inverter 110*b*, the embodiment of FIG. 1C provides an inverter switch control component 144*b* including a direct digital pulse width modulation component 168 using common mode reduction switching sequences 162. The direct digital PWM component 168 provides pulse width modulated switching control signals 142*b* to the inverter 110*b* via a driver circuit 170 based on a reference vector 171 derived from one or more setpoints (e.g., speed, torque, angle, etc.) and on feedback signals or values representing the output of the inverter 110*b* (e.g., phase voltages, currents, motor speed and/or position feedback, etc.). FIG. 1D illustrates another exemplary inverter control 144*b* with a carrier-based (e.g., sine-triangle) pulse width modulation component 168 with a carrier-wave generator 168*a* and comparators 168*b* using common mode reduction space vector modulation (CMR-PWM) switching sequences 162. Likewise, the exemplary switch control system 140 includes a rectifier control component 144*a* providing the control signals 142*a* to the active rectifier 110*a* according to CMRPWM switching sequences 162.

The switch control system 140 includes a rectifier control component 144*a* operatively coupled with the rectifier switching network S1-S6 to provide the rectifier switching control signals 142*a* to selectively provide DC power to the DC circuit 150. In addition, the control system 140 includes an inverter control component 144*b* operatively coupled with the inverter switching network S7-S12 to provide the inverter switching control signals 142*b* to cause the inverter 110*b* to selectively provide multi-phase AC electrical power to the multi-phase AC connection 114*b*. In accordance with various aspects of the present disclosure, moreover, the switch control system 140 provides either or both of the rectifier switching control signals 142*a* and the inverter switching control signals 142*b* by pulse width modulation according to a CMRPWM switching sequence. In implementations in which CMRPWM is used for both the inverter 110*b* and the rectifier 110*a*, the particular sequence need not be the same for both converter stages, and the rectifier and inverter may, but need not be synchronized. An exemplary set of CMRPWM switching sequences 162 is illustrated and described in greater detail below with respect to FIGS. 3A and 3B, in which a sequence 162 (e.g., sequences 162 in FIG. 3B) is selected according to a space vector modulation diagram sector in which a reference vector 171 is currently located (e.g., diagram 250 in FIG. 3A), with each switching sequence 162 using only active vectors with a first vector of each switching sequence 162 differing by one phase switching state from a last vector of a switching sequence 162 of an adjacent sector.

Figure 3A:
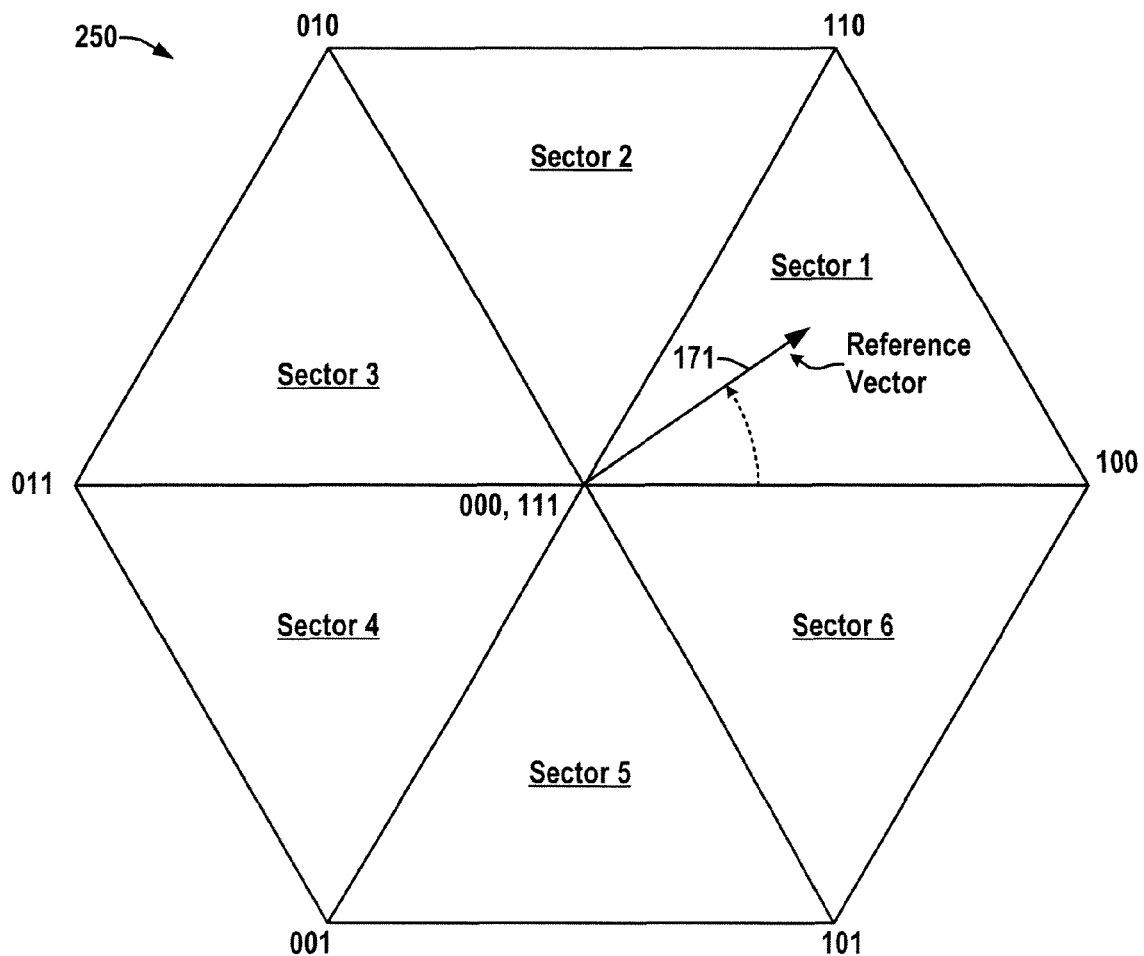
FIG. 3A is a schematic diagram illustrating an exemplary space vector modulation (SVM) diagram having six sectors and a rotating reference vector with peripheral corners defining active switching vectors used in the various common mode reduction pulse width modulation schemes of the present disclosure.
Figure 3B:
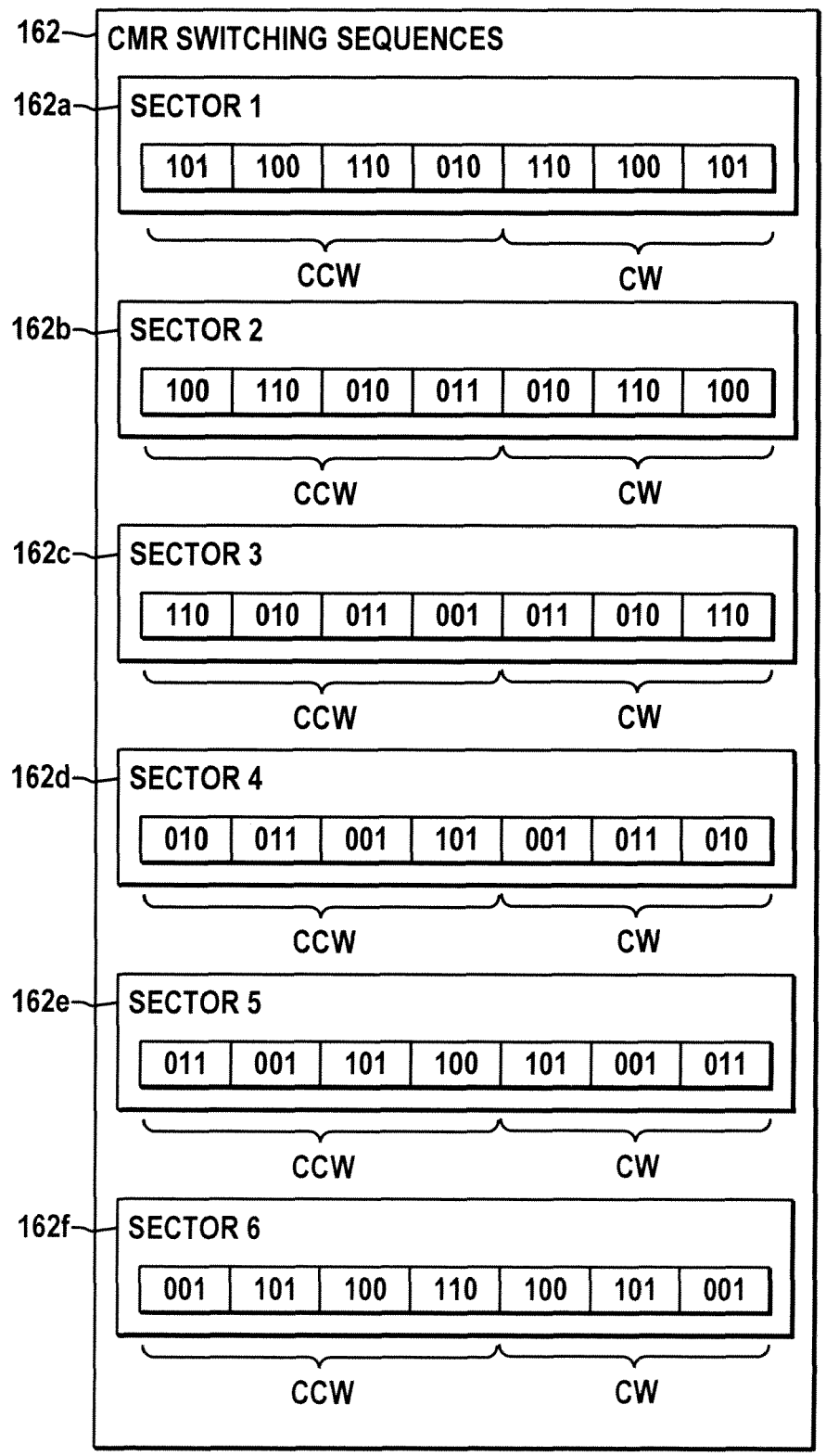
FIG. 3B is a schematic diagram illustrating an exemplary set of common mode reduction switching sequences for the six sectors in the diagram of FIG. 3A that can be used in the various common mode reduction pulse width modulation schemes of the present disclosure.
Figure 3B:
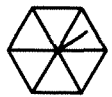
Figure 3B:
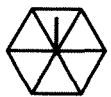
Figure 3B:
Figure 3B:
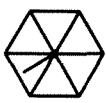
Figure 3B:
Figure 3B:

An exemplary space vector modulation diagram 250 shown in FIG. 3A includes six stationary active space vectors 100, 110, 010, 011, 001, and 101 positioned counterclockwise (CCW) around the periphery of the diagram as well as two stationary zero vectors 001 and 111 located at the diagram origin, where the active and zero vectors represent unique switching states for the inverter switching network S7-S12. The diagram 250 also defines six triangular sectors (labeled Sector 1 through Sector 6 in FIG. 3A) positioned around the origin, each of which is defined by a unique set of two of the active vectors and the zero vectors at the corners of the corresponding triangular segment. To operate the inverter, the switch control system 140 provides the switching control signals 142*b* according to a selected switching sequence 162 corresponding to the diagram sector in which the reference vector 171 is currently located. Likewise, the rectifier control component 144*a* provides the rectifier switching control signals 142*a* according to a selected switching sequence 162 corresponding to the diagram sector in which the rectifier reference vector 171 is currently located, such as corresponding to the phase and frequency of the AC input 112. As shown in FIG. 3B, moreover, each switching sequence 162 uses only active vectors, and substitutes diametrically opposite active vectors for the deleted zero vectors. For instance, the switching sequence 162*a* for sector 1 uses the active vectors 100 and 110 that bound the sector, and also uses diametrically opposite active vectors 010 and 101 as a substitute for the zero vectors.

As a result, the switching sequence 162a uses only active vectors. Moreover, the sequence 162a begins and ends with the active vector 101, which differs by one phase switching state from the last vector of the switching sequences associated with its adjacent (neighboring) sectors 2 and 6. In this regard, the first vector 101 of sector 1 sequence 162a differs by one switching state from the last vector 001 in the sequence 162f of neighbor sector 6. Likewise, the first vector 101 in sequence 162a for sector 1 differs by only one switching state from the last vector 100 in the sequence 162b of the other adjacent sector 2. In operation, the avoidance of the zero vectors is effective to combat common mode voltages at the motor load 120, whereby the switching sequences 162 are referred to herein as common mode reduction (CMR) sequences, and the pulse width modulation using these is referred to as CMRPWM. In addition, the sequences 162 each begin in a counterclockwise (CCW) direction, and finish in a clockwise (CW) direction as indicated in the diagram of FIG. 3B. The sequential vectors selected by this PWM technique differ from one another by only one switching state. The same is true for the sequences 162b-162f corresponding to sectors 2-6 in FIG. 3B. Thus, the exemplary CMR switching sequences 162 employed by the switch control system 140 do not cause concurrent switching of two phase states in the inverter 110b, even at sector transitions, thereby further reducing common mode voltages at the motor 120.

Referring also to FIGS. 3E-3G, tables 280, 282, and 284 respectively illustrate inverter and active rectifier switching vector usage and corresponding worst case common mode voltages for selective use of CMRPWM switching sequences 162 in the active rectifier 110a only, the inverter 110b only, and both the rectifier 110a and the inverter 110b of the illustrated power conversion system 110 in FIG. 1A. The inventors have appreciated that in converters having active rectifiers and active inverters, power can flow both directions (fully regenerative), where the active rectifier (e.g., rectifier 110a in FIG. 1A) switches power according to pulse width modulated control signals (142a) that can implement eight different switching states (including two zero vectors). In such converters, each switching converter (110a and 110b) has its own eight switching states and in many typical applications, the switching of the rectifier and inverter are not synchronized and are often switched at different carrier frequencies since the output (e.g., motor) speed is not the same as the AC input frequency which is fixed. In the worst case, concurrent switching of both the inverter and rectifier using a zero vector (e.g., vector 7 in one and vector 8 in the other) could result in common mode voltage at the output (e.g., motor load 120) equal to the DC bus level in the intermediate DC circuit 150. In order to combat common mode voltages, zero vectors are avoided in one or both of the rectifier 110a and/or the inverter 110b, regardless of whether or not the inverter 110b and rectifier 110a are synchronized in phase and frequency.

The table 280 in FIG. 3E illustrates one embodiment in which the rectifier control component 144a of the switch control system 140 uses CMRPWM sequences 162 for generating the rectifier switching control signals 142a and the inverter control component 144b does not, where the entries are scaled with respect to the DC bus voltage level of the intermediate circuit 150. In this case, with both inverter and rectifier switching at odd numbered active switching vectors or even numbered active vectors, the common mode voltage is zero. Also, where one converter stage (110a or 110b) is at an active odd switching vector and the other at an active even vector, the common mode voltage seen at the motor load 120 is one third of the DC bus value. Otherwise, if the inverter is currently switching using one of the zero vectors (7 or 8), the worst case common mode voltage is 2VDC/3 as shown in the table 280. Thus, the use of only the active vectors (CMRPWM) in the rectifier 110a reduces the worst case common mode voltage compared with conventional use of zero vectors in both converter stages, as there is no combination in the table 280 that results in common mode voltages equal to the DC bus value.

FIG. 3F shows a table 282 for another embodiment in which the inverter control component 144b of the switch control system 140 uses CMRPWM sequences 162 for generating the inverter switching control signals 142b, and the rectifier control component 144a does not. In this case, with both inverter and rectifier switching at odd numbered switching vectors, or both switching at even numbered vectors, the common mode voltage is again zero. Also, where one converter stage (110a or 110b) is at an active odd switching vector and the other at an even active vector, the common mode voltage seen at the motor load 120 is one third of the DC bus value, and if the rectifier 110a is switched using a zero vector, the worst case common mode voltage is 2VDC/3. The CMRPWM approach in the control of the inverter switching in this example again improves the worst case common mode voltage compared with conventional use of zero vectors in both converter stages.

Even better common mode voltage performance is seen in the table 284 of FIG. 3G, where the switch control system 140 employs active-only switching vectors (CMRPWM) in controlling both the active rectifier 110a and the inverter 110b. As shown in the table 284, the worst case common mode voltages are one third of the DC bus value, by which the usage of only active vectors in the CMRPWM switching sequences 162 in both the inverter 110b and the rectifier 110a greatly reduces the common mode voltages seen at the AC converter output 114b.

In certain embodiments, the switching and pulse width modulation of the rectifier 110a and the inverter 110b are synchronized with respect to frequency and phase to further control common mode voltage at the output. However, this is not a strict requirement of the disclosure, and other embodiments are contemplated (such as those related to FIGS. 3E-3G) in which the rectifier switching control signals 142a and the inverter switching control signals 142b are not synchronized. In this regard, the usage of CMRPWM active-only switching sequences 162 in one or both converter stages 110a and/or 110b provides common mode voltage reduction/control even if the rectifier 110a and inverter 110b are not synchronized, as shown in the tables 280, 282, and 284. Thus, while prior attempts at common mode reduction involved synchronizing the active rectifier and the inverter, these techniques are difficult, particularly where these converter stages are physically separate, such as where a single active rectifier is used to supply DC power for use by a number of physically separate switching inverters. Moreover, it is desirable in many instances to operate the active rectifier 110a at a higher PWM frequency than the inverter 110b, for example, to allow the use of small line reactor components LSA, LSB, and LSC between the input power source phases VAS, VBS, and VCS (112) and the rectifier switches S1-S6.

The exemplary inverter control components 144b of FIGS. 1C and 1D may also include reflected wave reduction and/or deadtime compensation components 164 and 160, respectively. In practice, the control component 144b of the switch control system 140 receives feedback signals or values Φ, which may be of any form, representing the AC phase outputs (phases u, v, and w in the illustrated examples). In operation of the illustrated embodiments, the optional deadtime compensation component 160 selectively adjusts one or more of the feedback signals or values Φ higher or lower for deadtime compensation at switching state transitions within a pulse width modulation period TPWM based on use of active high or active low pulse width modulation and the polarity of the phase current for the corresponding output phase Φ to generate deadtime compensated feedback signals or values Φ' (e.g. u', v', and w' in the described examples). In certain implementations, moreover, the deadtime compensated signals u', v', and w' are then selectively adjusted by the optional reflected wave reduction component 164 to generated feedback signals or values u", v", and w" (collectively Φ") used by the PWM component 168. The switch control system 140 generates pulse width modulated inverter switching control signals 142b and rectifier control signals 142a and the signals 142 are provided to the individual switches S1-S12 from the switch control system 140 in order to implement a given power conversion task. The switch control system 140 may be provided with one or more setpoint desired values and one or more feedback signals or values by which the output power is controlled. The setpoint inputs and the feedback signals or values Φ may be in any suitable form such as an electrical signal, digital data values, etc., and may be received from any suitable source, such as sensors, external networks, switches, a user interface provided on the drive 110, or other suitable source(s).

The switch control system 140 and the components 144, 160, 162, 164 thereof can be implemented as any suitable hardware, software, programmable logic, or combinations thereof, operative as any suitable controller or regulator by which the motor 120 is controlled according to one or more desired profile(s) or setpoint(s) in open or closed-loop fashion. In this regard, the exemplary controller can be operated in a number of different modes or control schemes, including controlling torque, speed, position, etc., although the particular motor control scheme or application is not a strict requirement of the present disclosure. The switch control system 140 is adapted to provide appropriate switching signals 142 to operate the motor 120 in accordance with a given control strategy, wherein the switch controls 142a provide pulse width modulation (PWM) switch timing control for conversion in the active rectifier 110a of three-phase AC power from the input power source 112 to provide DC power in the DC circuit 150, and for conversion of the DC power to AC output power via the inverter 110b in which the switches S7-S12 receive inverter switching control signals 142b from the inverter component 144b of the controller 140 in order to provide AC power of appropriate amplitude, frequency, and phase to the motor 120 in a controlled fashion.

Figure 2A:
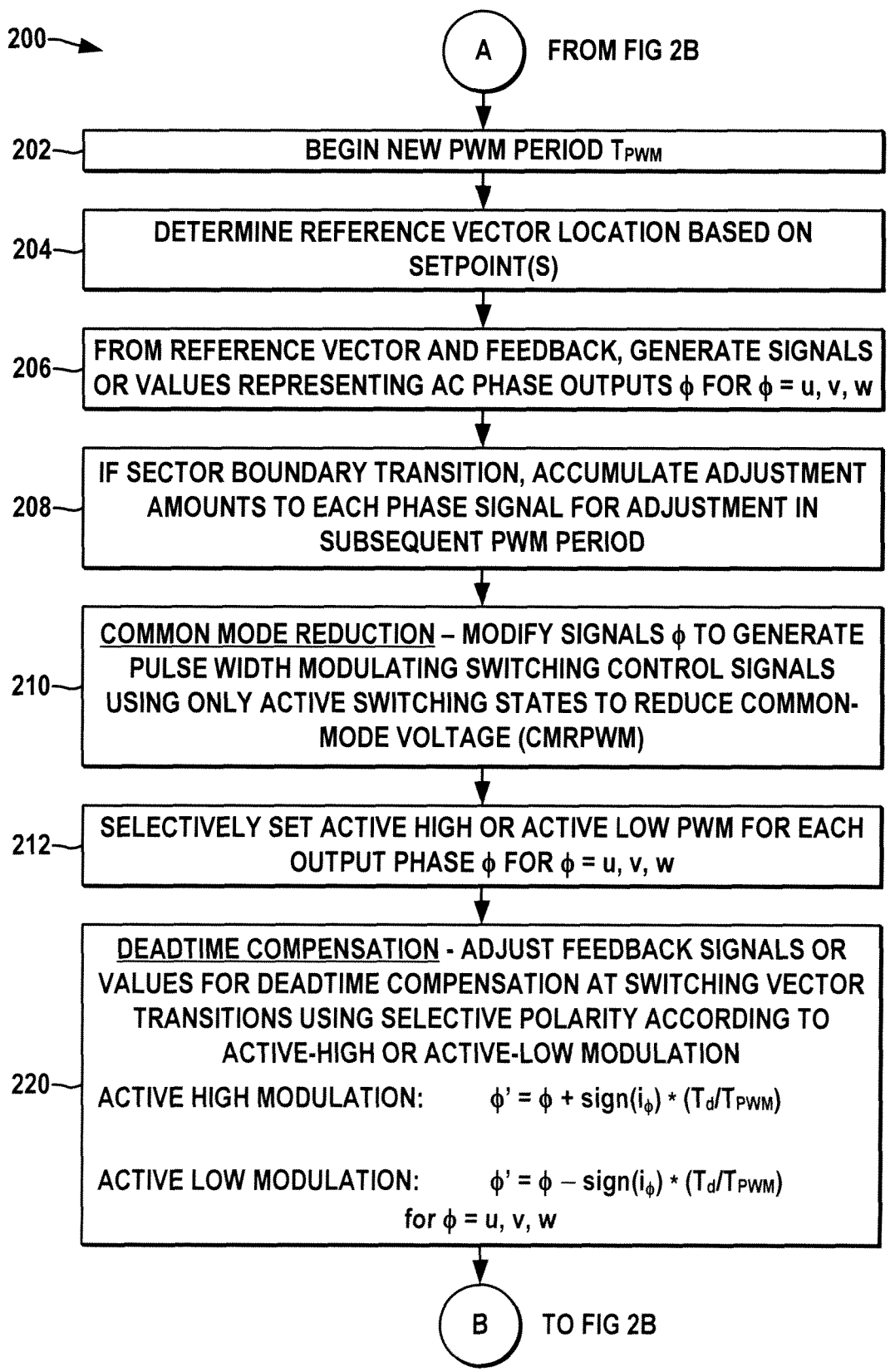
FIGS. 2A and 2B are a flow diagram illustrating an exemplary method for controlling a pulse width modulated power conversion system in accordance with other aspects of the present disclosure.
Figure 2B:
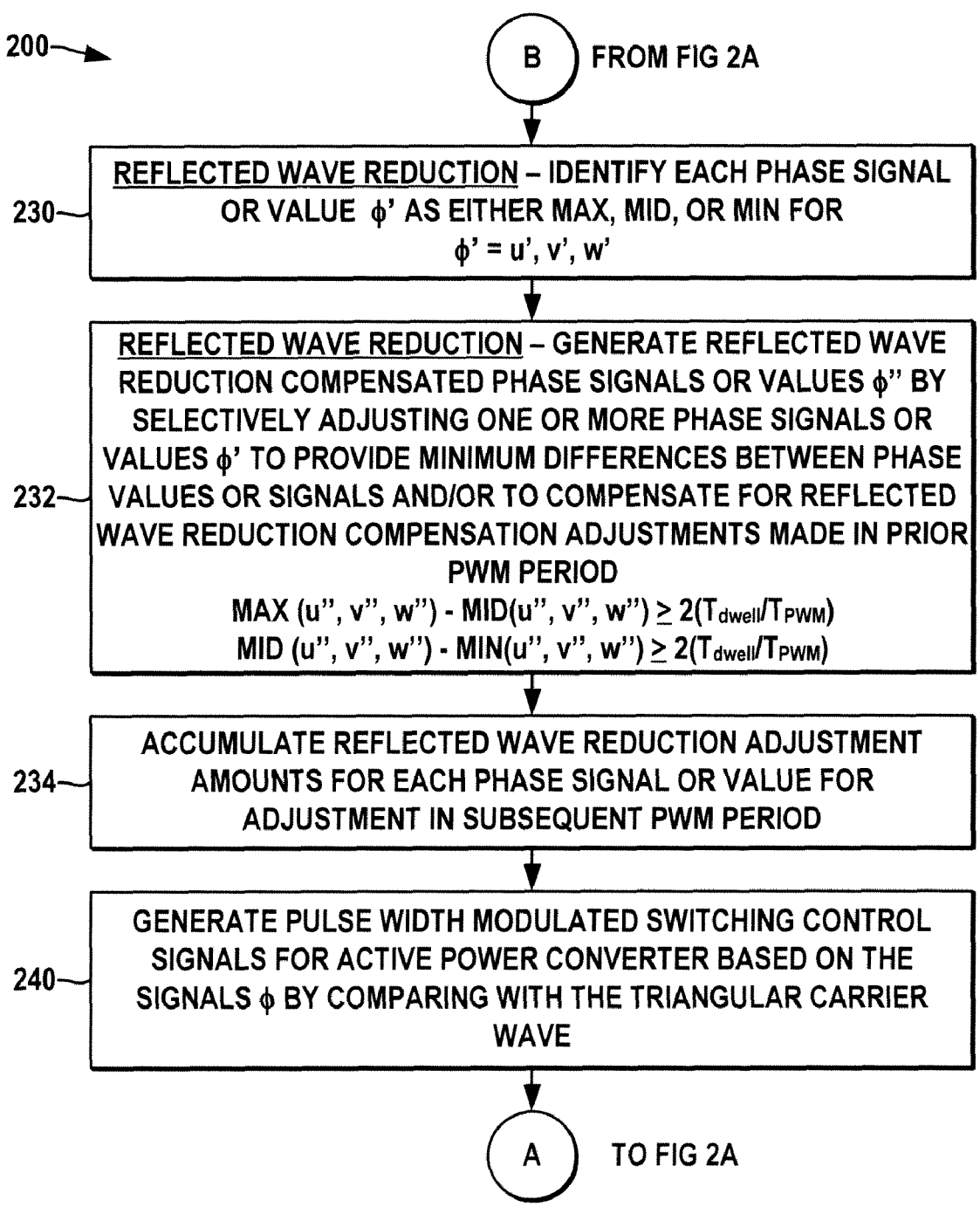

Referring also to FIGS. 2A-3C, a process 200 is illustrated in FIGS. 2A and 2B by which the switch control system 140 generates the pulse width modulated switching control signals 142b for the inverter 110b using space vector modulation according to a set of switching sequences 162a-162f (FIG. 3B) for each sector of a space vector modulation diagram 250 (FIG. 3A). Although the PWM power converter control method 200 is illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the CMR pulse width modulation control functionality described herein, and may be employed in any power conversion system including but not limited to the above illustrated system 110, wherein the disclosure is not limited to the specific applications and embodiments illustrated and described herein. Moreover, the following description of the active-only vector switching sequences 162 is applicable to active rectifier control embodiments in which CMRPWM sequences 162 are used in generating the pulse width modulated rectifier switching control signals 142a.

Figure 3C:
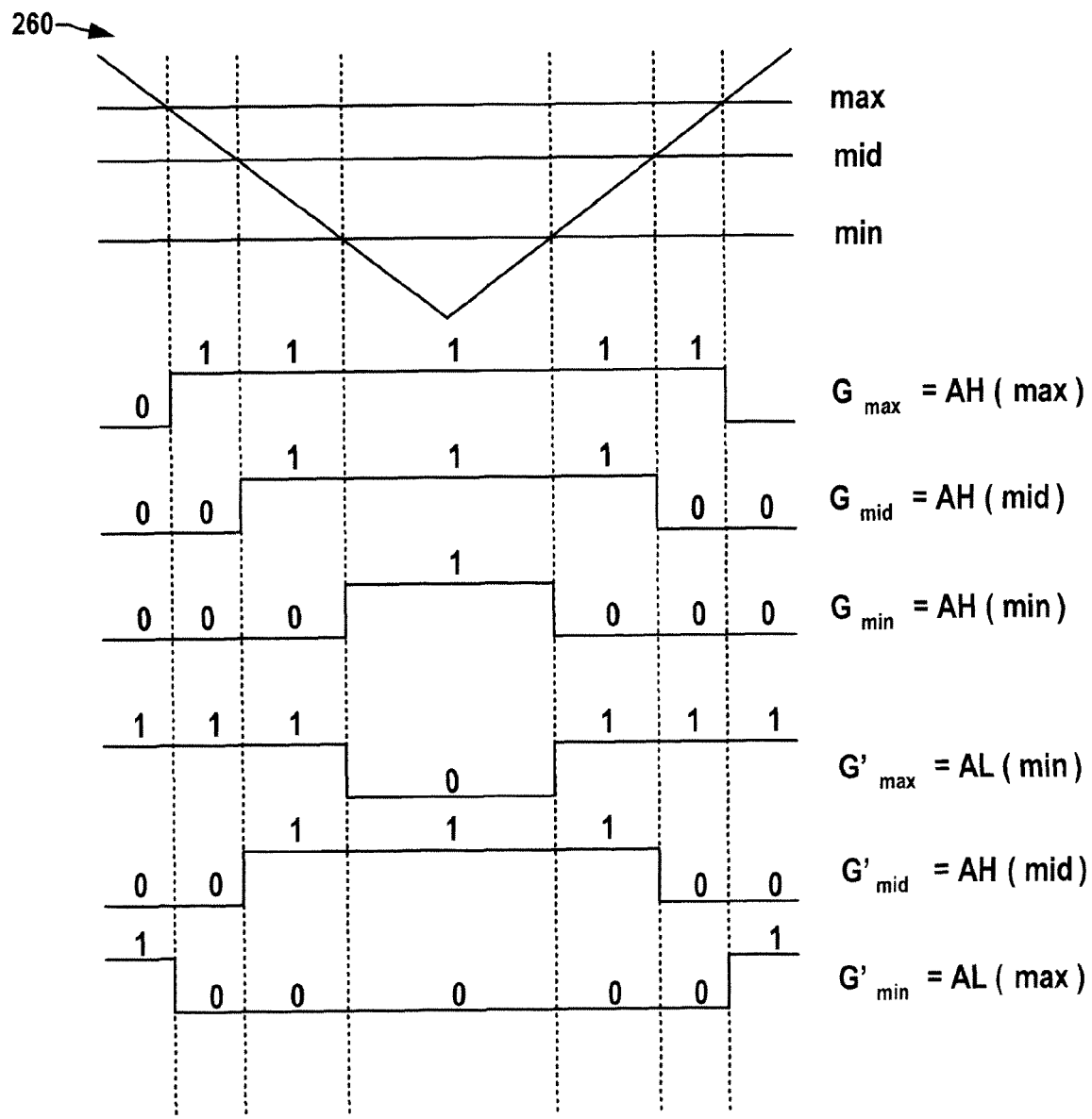
FIGS. 3C and 3D are timing diagrams illustrating exemplary phase feedback signals or values and a triangle carrier wave, with selective use of active high or active low pulse width modulation in the controller of FIGS. 1A and 1B in accordance with various aspects of the present disclosure.
Figure 3D:
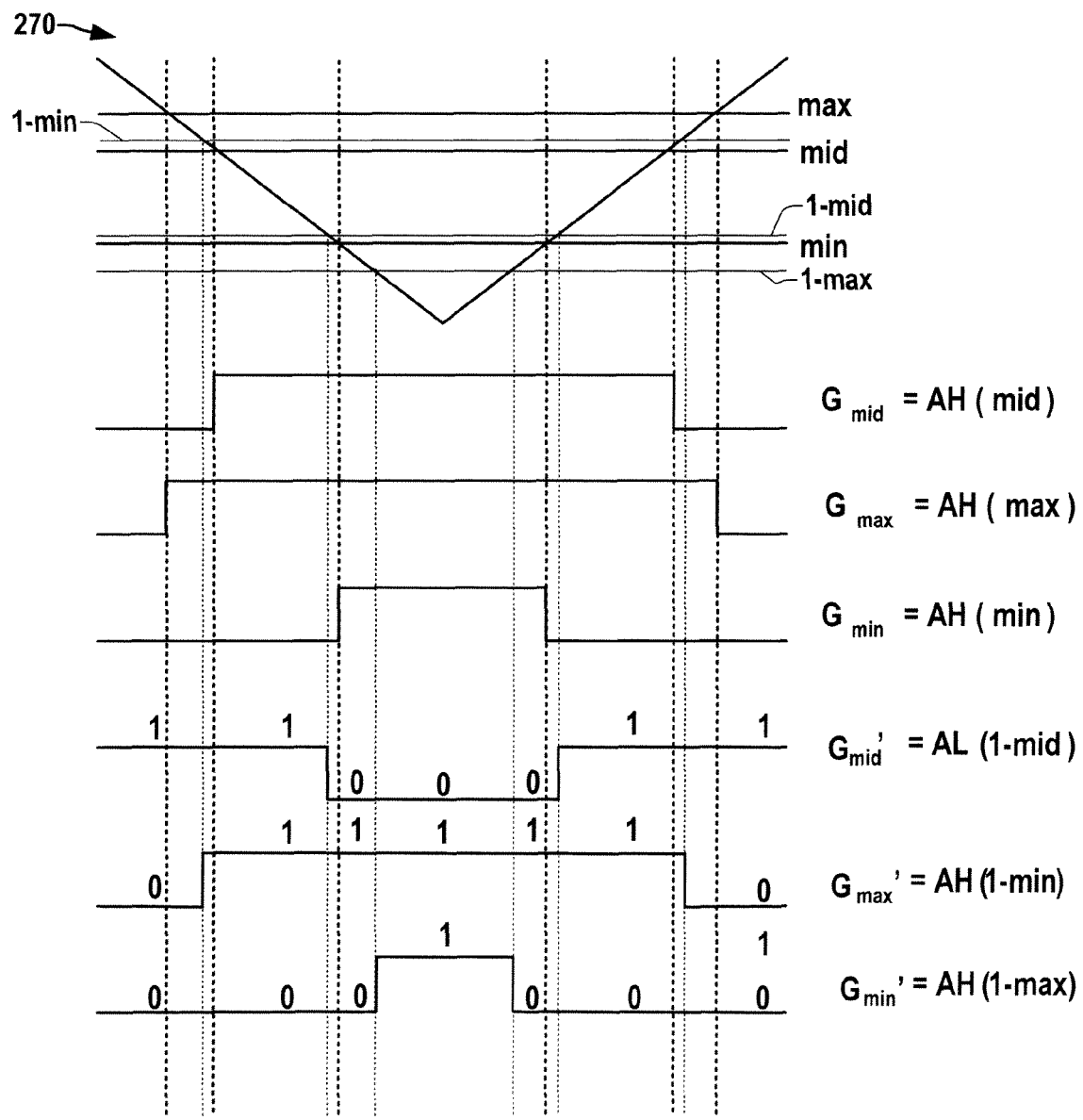

FIG. 3C illustrates a timing diagram 260 showing exemplary phase feedback signals or values labeled max, mid, and min, along with and a triangle carrier wave, where the max, mid, and min curves represent the three output phase values Φ (e.g., u, v, and w) at a given point in time when the feedback signals or values are obtained by the switch control system 140. The three modulating signals are manipulated as shown in the diagram 260, in which G represents the phase switching function to generate the switching sequence 162a for sector 1 as described above (e.g., 101, 100, 110, 010, 110, 100, and 101). It is noted that whereas conventional PWM techniques exclusively employ active high pulse width modulation (e.g., gating signal hi state when the modulating wave is greater than the triangle wave means the upper phase switch is on and the lower phase switch is off), the illustrated CMRPWM technique employed in the controller 140 selectively employs both active high (AH) and active low (AL) modulation. In one possible implementation, the modulating waves may be modified by the CMRPWM component 168 to generate the CMRPWM switching pulse pattern in sector 1, with max being phase U and min being phase W (v is mid). In this implementation, the controller 140 uses the W phase modulating signal to gate pole U with active low PWM logic (e.g., when the modulating feedback signal/value wave is less than the triangle carrier wave, the upper switch is turned on). Also, the phase U modulating signal is used to gate pole W, also using active low logic, and there is no inversion of the logic for gating of pole V (remains active high logic). One suitable implementation is illustrated and described in the above referenced U.S. Pat. No. 7,164,254 to Kerkman et al. in which the three phase voltages u, v, and w are compared with each other to determine a max voltage in one phase, a min voltage in another phase and a mid voltage in the remaining phase, with the phase voltages and active high/low modulation being inverted for the max and min phases. By this technique, the resulting gating signals G' are obtained as shown in FIG. 3C by which the exemplary sector 1 sequence 162a is achieved. This technique can be employed in hardware, logic, software, firmware, or combinations thereof, for carrier-based (e.g., sine-triangle) implementation as shown in FIG. 1E above. The timing diagram of FIG. 3C when applied to sectors 1, 3, 5 of FIG. 3A produce the switching sequences as shown in FIG. 3B. If the timing diagram of FIG. 3C is applied to sector 2, the resulting switching sequence is {011, 010, 110, 100, 110, 010, 011}. The start vector of this sequence (011) differs from the end vector of sector 1 (101) in two phases u and v. Hence, this will result in spikes in the common-mode voltage during transition from sector 1 to sector 2 or vice-versa. FIG. 3D illustrates a timing diagram 270 showing exemplary phase feedback signals or values labeled max, mid, and min, along with a triangle carrier wave, where the max, mid, and min curves represent the three output phase values Φ (e.g., u, v, and w) at a given point in time when the feedback signals or values are obtained by the switch control system 140. The three modulating signals are manipulated as shown in the diagram 270, in which G represents the phase switching function to generate the switching sequence 162b for sector 2 (e.g., 100, 110, 010, 011, 010, 110, and 100). In one possible implementation, the modulating waves may be modified by the CMRPWM component 168 to generate the CMRPWM switching pulse pattern in sector 2, with max being phase V and min being phase W (U is mid) in the illustrated example. In this implementation, the controller 140 uses the modified W phase modulating signal 1-w to gate pole V with active high PWM logic. Also, the modified phase V modulating signal 1-v is used to gate pole W, also using active high logic. The modified U phase modulating signal 1-u is used to gate phase U with active high PWM logic. By applying the timing diagram of FIG. 3D to sectors 2, 4 and 6, switching sequences 162b, 162d and 162f, respectively, shown in FIG. 3B can be generated, which have only one phase changing state during sector transitions.

Returning to FIGS. 2A and 2B, the process 200 begins for a new PWM period at 202 in FIG. 2A with the switch control system 140 controlling the inverter 110b through generation of the pulse width modulated signals 142b. In one example, the PWM period may be 500 μsec for pulse width modulation at a 2 kHz frequency. At 204 in FIG. 2A, a reference vector location is determined (e.g., reference vector 171 in FIG. 3A) based on feedback signals or values and received setpoint information. For instance, the desired motor position and torque may be represented in terms of the magnitude and angle of the vector 171. The controller 140 generates signals or values at 206 which represent the AC phase outputs Φ (e.g., u, v, and w) based on the reference vector. The exemplary process 200 optionally includes deadtime compensation at sector boundaries and/or at other switch state transitions (e.g., at 208 and/or 220 in the process 200 of FIGS. 2A and 2B). In this regard, the inverter 110b includes upper and lower switches for each of the three output phases u, v, and w. During a transition in a given phase Φ, for instance, from 1 to 0, if the top switch is on, and the controller 140 needs to commutate and turn the bottom switch on, both switches are turned off for a brief period of time, referred to herein as the deadtime (the time between turning the top switch off and turning the bottom switch on (or vice versa)) so as to avoid short-circuiting the DC circuit 150. This is a function of the physical limitations of IGBTs or other switching devices, because the switches don't turn off instantaneously.

Referring also to FIG. 1C, the inventors have appreciated that when both switches are off (to achieve the deadtime), the output voltage of that particular phase is not controlled. Depending upon the current flowing in that particular phase, one of the anti-parallel diodes (across the IGBT switch) would clamp either up or down. As a result, the desired volt-second balance of the control scheme will not be assured, because during the downtime interval, the phase voltage can either be clamped up or down, and thus the phase voltage is essentially uncontrolled during the deadtime. The resulting control error is particularly significant at very low speeds when the output voltages are also low, because the desired phase voltages are far away from Vdc. For example, a 460 volt motor at 60 Hz nominal may be running at 5 Hz and at a very low voltage, and the error caused by the deadtime (when the anti-parallel diode clamps the phase voltage to either 0 volts or Vdc) can be large, leading to distortion in the output voltage. The inventors have further appreciated that because the CMRPWM switching sequences eliminate the zero vectors, conventional deadtime compensation techniques are unsuitable.

Figure 4A:
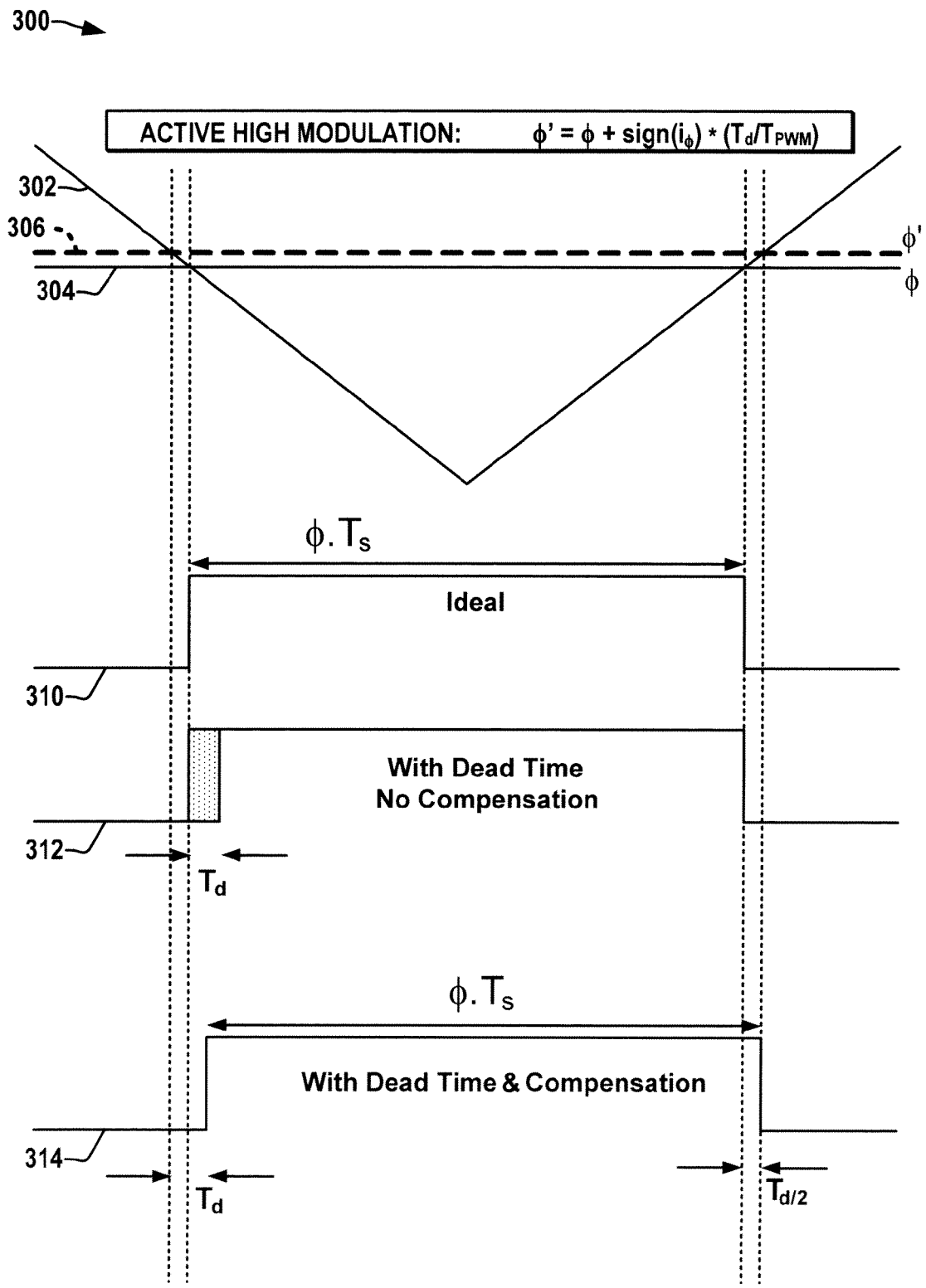
FIGS. 4A and 4B are timing diagrams illustrating selective deadtime compensation through additive or subtractive adjustment of one or more feedback signals or values based on active high or active low modulation in accordance with various aspects of the present disclosure.
Figure 4B:
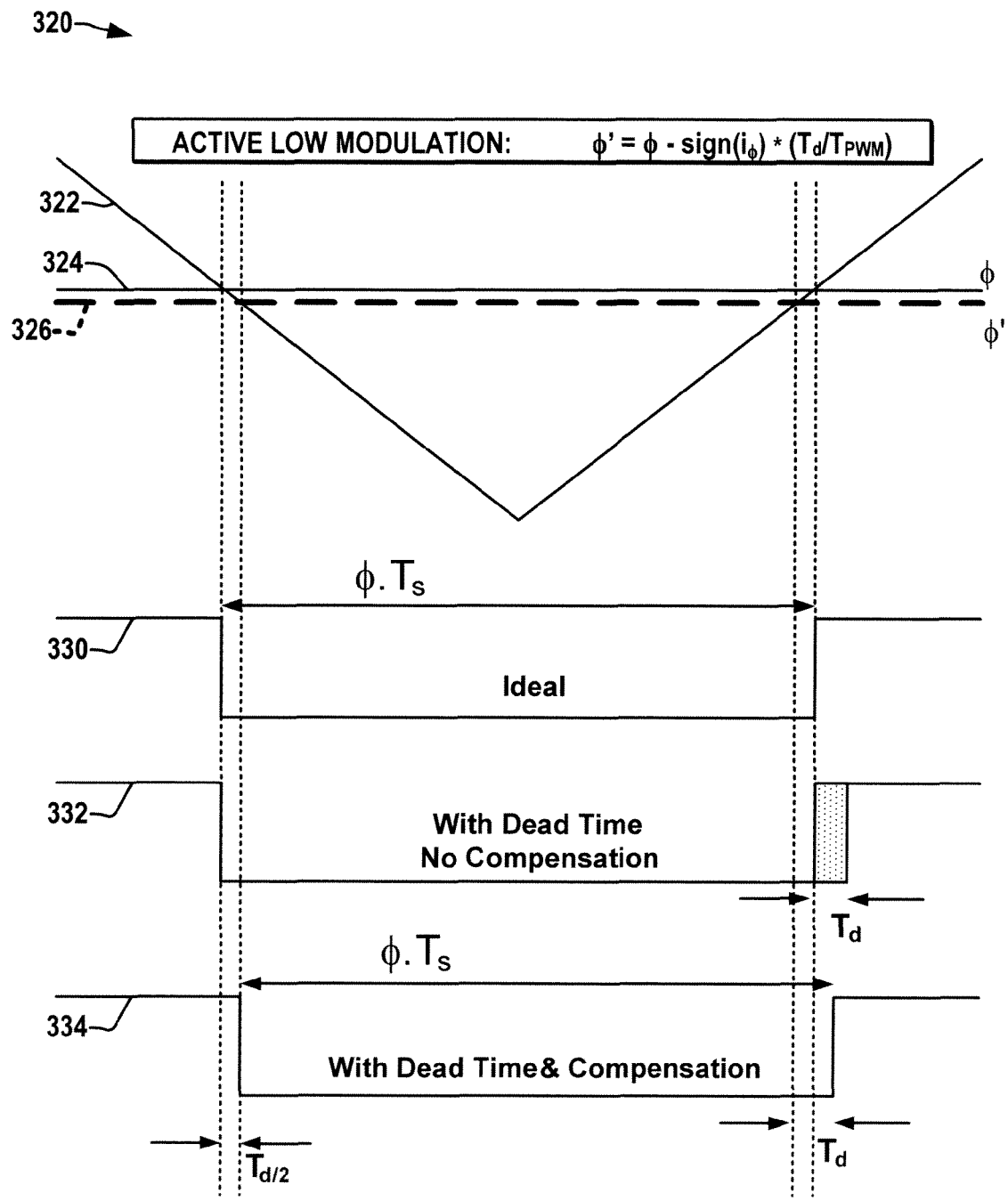

Referring also to FIGS. 4A and 4B, in order to provide deadtime compensation in conjunction with the use of the CRMPWM sequences 162, the switch control system selectively provides some of the switching control signals 142b using active high pulse width modulation and other switching control signals 142b using active low pulse width modulation, and optionally employs the deadtime compensation component 160 to selectively adjust one or more of the feedback signals or values Φ higher or lower for deadtime compensation at switching state transitions and/or at sector transitions based on use of active high or active low pulse width modulation and the polarity of the phase current for the corresponding output phase. In the illustrated embodiment, the deadtime compensation component 160 is operative to selectively adjust the feedback signals or values Φ according to the following equation (1) for active high pulse width modulation:

$$\phi' = \phi + \text{sign}(i_\phi) * (T_d/T_{PWM}), \quad (1)$$

and selectively adjusts the feedback signals or values Φ according to the following equation (2) for active low pulse width modulation:

$$\phi' = \phi - \text{sign}(i_\phi) * (T_d/T_{PWM}), \quad (2)$$

where $i_\phi$ is a corresponding phase current, $T_d$ is a predetermined deadtime value (e.g., 2 μsec in one example), and $T_{PWM}$ is a pulse width modulation period (e.g., 500 μsec).

As shown in the diagram 300 of FIG. 4A, the deadtime compensation component 160 operates to selectively raise the feedback signal or value Φ' above the uncompensated signal or value Φ for active high PWM modulation. As a result, the curve 306 representing the adjusted signal/value Φ' crosses the carrier 302 at a higher value than does the uncompensated curve 304, and thus the active high modulation causes the creation of the switching pulse in curve 314 in FIG. 4A with the dead time and compensation time delayed relative to the ideal case curve 310, but having the same pulse width Φ.Ts. This represents an improvement over the uncompensated case shown in curve 312 in FIG. 4A, which has a different (shorter) pulse width, thereby causing output voltage distortion. For active low modulation, the diagram 320 in FIG. 4B shows the carrier waveform 322, the uncompensated phase signal or value 324 (Φ) and the compensated phase signal or value 326 (Φ"). As seen in the active low modulation case, without compensation, the deadtime included in the resulting pulse curve 332 results in a pulse width which is longer than that of the ideal curve 330. However, through change in the polarity of the compensation equation (2) above for the active low modulation case, the curve 334 showing the resulting switching pulse for the case with the deadtime and the compensation, the pulse width is maintained the same as the ideal case, while the entire pulse is shifted in time. In this manner, the adjusted feedback signals or values Φ' are generated by the deadtime compensation component 160 prior to their use in the pulse width modulation by the CMRPWM component 162. By this technique, the optional sector boundary deadtime compensation is selectively performed at 208 in FIG. 2A if a sector transition is occurring.

At 210, the process 200 continues with selection of the appropriate CMRPWM switching sequence (e.g., one of the sequences 162a-162f in FIG. 3B is selected) at 208 based on the current reference vector location in the diagram 250 of FIG. 3A. At 212, the selected active high or active low PWM mode is set for each phase u, v, and w (e.g., based on the current switching sequence 162). The process 200 continues in FIG. 2A with optional deadtime compensation at 220 at the switching vector transitions within the current PWM period TPWM, using the above described equations (1) and (2) according to the active high or low polarity of the pulse width modulation mode.

Figure 5A:
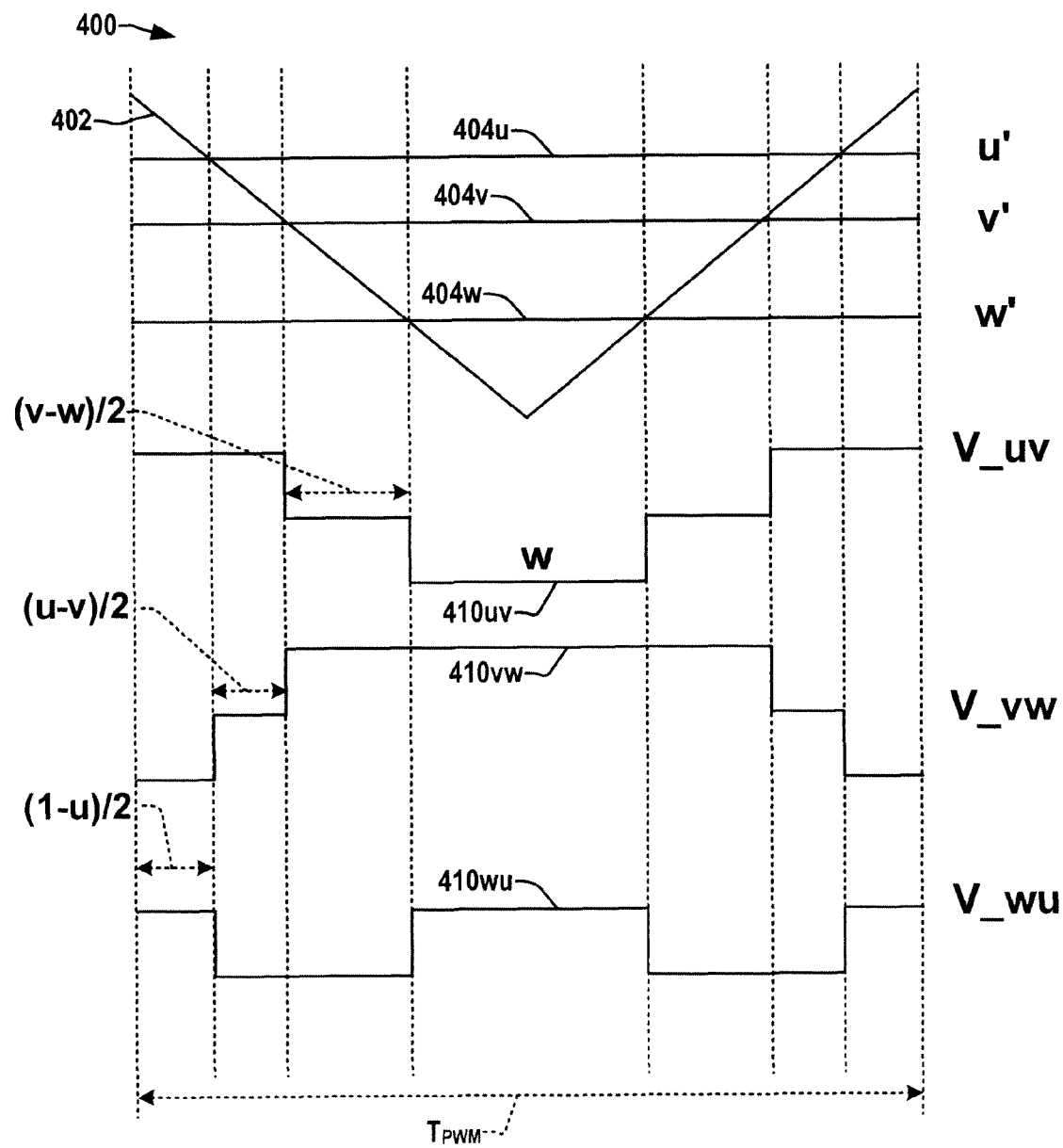
FIGS. 5A and 5B are timing diagrams illustrating selective reflected wave reduction through adjustment of one or more feedback signals or values in accordance with other aspects of the present disclosure.
Figure 5B:
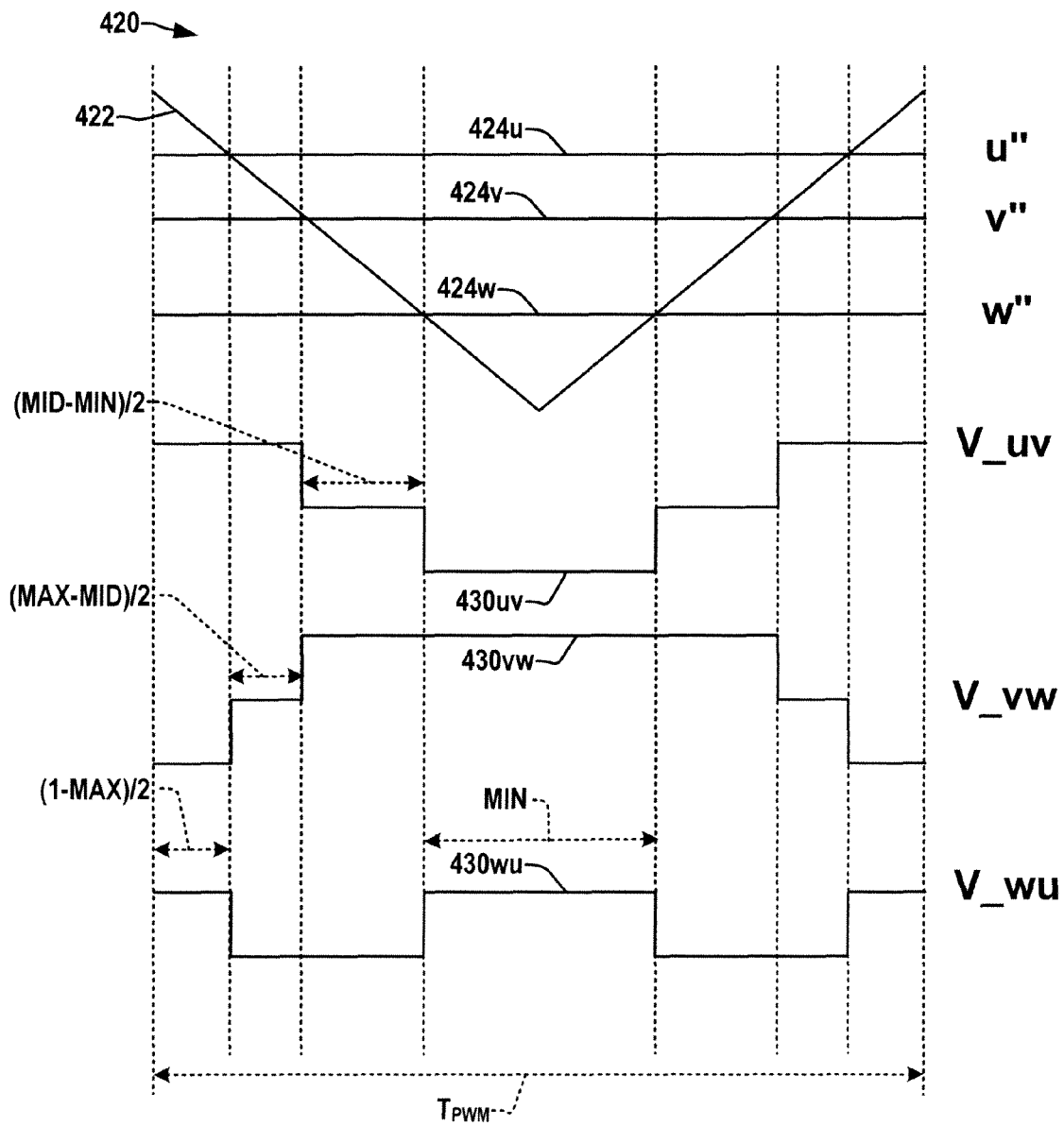

Referring now to FIGS. 2B, 5A, and 5B, in accordance with further aspects of the present disclosure, the process 200 optionally includes selective reflected wave reduction at 230-234 implemented in the reflected wave reduction component 164 of the exemplary switch control system 140. The reflected wave reduction component 164 operates at each pulse width modulation period TPWM to determine max, mid, and min ones of the feedback signals or values Φ (or of the deadtime compensated signals or values Φ') at 230 in FIG. 2B. Based on this determination, the component 164 selectively adjusts one or more feedback signals or values Φ (Φ') higher or lower at 232 for deadtime compensation at sector transitions to provide minimum differences between the adjusted feedback signals or values Φ" according to the following equations (3) and (4):

$$(\max-\mathrm{mid}) \geq 2(T_{dwell}/T_{PWM}), \text{ and} \qquad (3)$$

$$(\mathrm{mid}-\min) \geq 2(T_{dwell}/T_{PWM}), \qquad (4)$$

where $T_{dwell}$ is a predetermined dwell time.

FIG. 5A shows a timing diagram 400 depicting the triangle carrier wave 402 and three modulating (sine) waves 404u, 404v, and 404w for the three output phases of the inverter 110b, as well as corresponding line-line output voltage curves 410uv, 410vw, and 410wu. The diagram 400 also illustrates the corresponding widths on the curves 410 at which the line-line voltage is zero due to the proximity of the corresponding feedback values or signals (e.g., (v−w)/2, (u−v)/2, and (1−u)/2, respectively). As the modulating waveform v gets closer to w, for instance, then (v−w) gets closer to zero, where the resulting pulse width modulation can lead to an undesirable direct transition from positive to negative or vice versa. In normal operation, absent reflected wave compensation, all the phase voltages will cross one another periodically, and will be close to one another just before and just after they cross. Absent reflected wave compensation, moreover, whenever this occurs, a direct transition in the line-line voltage output from positive to negative with happen, resulting in creation of a reflected wave in the cable between the drive 110 and the motor 120, with the motor 120 experiencing potentially high voltages and possible insulation damage.

Using the adjustment by the reflected wave reduction component 164, FIG. 5B shows a timing diagram 420 illustrating adjusted feedback signals or values u", v", and w" to puts a lower limit on the widths in the resulting line-line voltage curves 430uv, 430vw, and 430wu. In this implementation, the minimum widths in the voltage curves 430 (mid−min), (max−mid), and (1−max) are held to be greater than or equal to 2(Tdwell/TPWM) at all times through selective adjustment of one or more of the phase signals or values Φ. This prevents direct transition from positive to negative in the switching patterns for each phase, and advantageously mitigates reflected waves in conjunction with the CMRPWM switching sequences 162 used in the controller 140 to avoid generating the high voltage switching pulses that would otherwise cause potentially damaging reflected waves.

At 234 in FIG. 2B, in accordance with further aspects of the disclosure, the reflected wave reduction component 164 accumulates reflected wave adjustment amounts for each phase signal or value Φ, and adjusts one or more feedback signals or values Φ higher or lower at 232 in a subsequent pulse width modulation period TPWM to compensate for the reflected wave reduction adjustments in a previous pulse width modulation period TPWM. Otherwise, when the modulating signal (u', v', or w') is modified to maintain the minimum difference to avoid the reflected wave generation, this distorts the resulting motor phase output voltage, since the switching pattern is changed from what it otherwise would be. To avoid distortion, the accumulation at 234 and subsequent compensating adjustment at 232 accounts for accumulated error (e.g., a difference in switch on-time), and compensates by that amount in the next PWM period by again adjusting the modulating signals the other way.

In accordance with further aspects of the present disclosure, a computer readable medium is provided, such as a computer memory, a memory within a power converter control system (e.g., switch control system 140 in FIGS. 1A and 1B above), a CD-ROM, floppy disk, flash drive, database, server, computer, etc.) which has computer executable instructions for performing the processes disclosed above. The above disclosure thus provides techniques and apparatus for mitigating the adverse impact of common mode voltage generated by pulse width modulated regenerative conversion systems on driven AC motors or other loads, thus preventing damage to motor bearings, insulation, etc., while addressing deadtime compensation and reflected wave reduction issues using select CMRPWM switching sequences in one or both of the active rectifier 110a and/or the switching inverter 110b of a fully regenerative power conversion system 110. The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
a DC circuit comprising first and second DC current paths;
an active rectifier comprising an AC input receiving AC electrical input power, and a rectifier switching network comprising a plurality of rectifier switching devices individually coupled between the AC input and one of the DC current paths of the DC circuit, the rectifier switching devices individually operable to selectively electrically couple the AC input with a corresponding DC current path according to a corresponding rectifier switching control signal;
an inverter comprising a multi-phase AC connection having three or more AC terminals for supplying multi-phase AC electrical power, and an inverter switching network comprising a plurality of inverter switching devices individually coupled between one of the DC current paths and one of the AC terminals, the inverter switching devices individually operable to selectively electrically couple the corresponding DC current path with the corresponding AC terminal according to a corresponding inverter switching control signal; and a switch control system comprising a rectifier control component operatively coupled with the rectifier switching network to provide the rectifier switching control signals to selectively provide DC power to the DC circuit, and an inverter control component operatively coupled with the inverter switching network to provide the inverter switching control signals to cause the inverter to selectively provide multi-phase AC electrical power to the multi-phase AC connection, the switch control system providing either or both of the rectifier switching control signals and the inverter switching control signals by pulse width modulation according to a selected switching sequence corresponding to a sector of a space vector modulation diagram in which a reference vector is currently located, with each switching sequence using only active vectors with a first vector of each switching sequence differing by one phase switching state from a last vector of a switching sequence of an adjacent sector.

2. The power conversion system of claim 1, wherein the switch control system is operative to provide both of the rectifier switching control signals and the inverter switching control signals by pulse width modulation according to selected switching sequences using only active vectors.

3. The power conversion system of claim 2, wherein the switch control system is operative to synchronize the rectifier switching control signals and the inverter switching control signals.

4. The power conversion system of claim 2, wherein the rectifier switching control signals and the inverter switching control signals are not synchronized.

5. The power conversion system of claim 1, wherein the switch control system is operative to synchronize the rectifier switching control signals and the inverter switching control signals.

6. The power conversion system of claim 1, wherein the rectifier switching control signals and the inverter switching control signals are not synchronized.

7. The power conversion system of claim 1, wherein the inverter control component comprises a deadtime compensation component operative to selectively adjust one or more feedback signals or values higher or lower for deadtime compensation at switching state transitions within a pulse width modulation period based on use of active high or active low pulse width modulation, respectively, for a corresponding output phase.

8. The power conversion system of claim 7, wherein the deadtime compensation component is operative to selectively adjust one or more feedback signals or values $\Phi$ higher or lower for deadtime compensation at sector transitions.

9. The power conversion system of claim 1, wherein the inverter control component comprises a reflected wave reduction component operative at each pulse width modulation period $T_{PWM}$ to determine max, mid, and min ones of the feedback signals or values $\Phi$, and to selectively adjust one or more feedback signals or values $\Phi$ higher or lower at switching vector transitions to provide minimum differences between the feedback signals or values $\Phi$ according to the equations $(max-mid) > 2(Tdwell/T_{PWM})$ and $(mid-min) > 2(Tdwell/Tp_{PWM})$, where Tdwell is a predetermined dwell time.

10. A method of mitigating common mode voltages in a regenerative power conversion system having an active rectifier, a DC circuit, and a switching inverter, the method comprising:

providing pulse width modulated rectifier switching control signals to a plurality of rectifier switching devices of the active rectifier to rectify input AC electrical power to selectively provide DC power to the DC circuit; and providing pulse width modulated inverter switching control signals to a plurality of inverter switching devices of the inverter to convert DC power to cause the inverter to selectively provide multi-phase AC electrical output power;

wherein either or both of the rectifier switching control signals and the inverter switching control signals are provided according to switching sequences using only active vectors.

11. The method of claim 10, wherein both of the rectifier switching control signals and the inverter switching control signals are provided according to switching sequences using only active vectors.

12. The method of claim 11, further comprising synchronizing the rectifier switching control signals and the inverter switching control signals.

13. The method of claim 11, wherein the rectifier switching control signals and the inverter switching control signals are not synchronized.

14. The method of claim 10, further comprising synchronizing the rectifier switching control signals and the inverter switching control signals.

15. The method of claim 14, wherein the rectifier switching control signals are provided according to switching sequences using only active vectors.

16. The method of claim 14, wherein the inverter switching control signals are provided according to switching sequences using only active vectors.

17. The method of claim 10, wherein the rectifier switching control signals and the inverter switching control signals are not synchronized.

18. The method of claim 17, wherein the rectifier switching control signals are provided according to switching sequences using only active vectors.

19. The method of claim 17, wherein the inverter switching control signals are provided according to switching sequences using only active vectors.

20. The method of claim 10, wherein the rectifier switching control signals are provided according to switching sequences using only active vectors.

21. The method of claim 10, wherein the inverter switching control signals are provided according to switching sequences using only active vectors.

* * * * *